United States Patent
Rowe et al.

(10) Patent No.: US 12,364,326 B2
(45) Date of Patent: Jul. 22, 2025

(54) RETRACTABLE TABLE STRUCTURE

(71) Applicant: Toyota Motor Engineering & Manufacturing North America, Inc., Plano, TX (US)

(72) Inventors: Michael Paul Rowe, Pinckney, MI (US); Danil V. Prokhorov, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 123 days.

(21) Appl. No.: 18/178,302

(22) Filed: Mar. 3, 2023

(65) Prior Publication Data

US 2024/0292945 A1    Sep. 5, 2024

(51) Int. Cl.
*A47B 3/04* (2006.01)
*F03G 7/06* (2006.01)
*B60P 3/36* (2006.01)

(52) U.S. Cl.
CPC ............ *A47B 3/04* (2013.01); *F03G 7/06143* (2021.08); *A47B 2200/0035* (2013.01); *B60P 3/36* (2013.01)

(58) Field of Classification Search
CPC ... A47B 3/04; A47B 2200/0035; A47B 37/00; A47B 3/02; A47B 43/02; F03G 7/06143; B60P 3/36; B60N 3/002; B60N 3/102; B60R 5/048
USPC ........ 108/21, 42, 44, 45, 137, 152; 312/297; 248/346.4
See application file for complete search history.

(56) References Cited

U.S. PATENT DOCUMENTS

| | | | |
|---|---|---|---|
| 278,787 A * | 6/1883 | Waters | |
| 2,322,755 A * | 6/1943 | Voorhies | B60R 21/02 280/751 |
| 2,508,804 A * | 5/1950 | Schwindt | A47B 13/16 108/93 |
| 2,588,706 A * | 3/1952 | Davis | B60N 3/002 108/68 |
| 6,227,515 B1 * | 5/2001 | Broyles | G02B 7/00 248/346.02 |

(Continued)

FOREIGN PATENT DOCUMENTS

WO    WO-2019137048 A1 *   7/2019   .......... F03G 7/0614

OTHER PUBLICATIONS

WO2019137048 English abstract (Year: 2019).*

(Continued)

*Primary Examiner* — Janet M Wilkens
(74) *Attorney, Agent, or Firm* — Christopher G. Darrow; Darrow Mustafa PC

(57) ABSTRACT

A table structure includes a table top structured to be configurable to a retracted configuration and to a fully deployed configuration for use. At least one shape memory material (SMM) member is operably connected to the table top such that energization of the SMM member configures the table top to the fully deployed configuration and de-energization of the at least one SMM member enables configuration of the table top the retracted configuration. The table structure may be incorporated into a wall of a vehicle as an optional, retractable accessory.

19 Claims, 11 Drawing Sheets

(56) References Cited

U.S. PATENT DOCUMENTS

| | | | | |
|---|---|---|---|---|
| 6,394,001 B1* | 5/2002 | Giesey | | B60N 3/002 |
| | | | | 108/44 |
| 7,735,940 B2* | 6/2010 | Chiu | | B32B 29/005 |
| | | | | 312/205 |
| 8,894,142 B2* | 11/2014 | Alexander | | B60N 2/876 |
| | | | | 297/216.12 |
| 10,029,618 B2* | 7/2018 | Perez Astudillo | | B60R 5/048 |
| 10,993,526 B2* | 5/2021 | Vandewall | | A47B 13/081 |
| 2004/0118854 A1* | 6/2004 | Kutun | | B65D 11/1846 |
| | | | | 220/507 |
| 2008/0010912 A1* | 1/2008 | Hanson | | E04C 3/005 |
| | | | | 52/109 |
| 2009/0074993 A1* | 3/2009 | Gao | | B60J 1/2033 |
| | | | | 160/310 |
| 2010/0244505 A1* | 9/2010 | Demick | | B60R 11/0235 |
| | | | | 296/37.16 |
| 2011/0017103 A1* | 1/2011 | Lee | | A47B 83/02 |
| | | | | 108/42 |
| 2014/0196633 A1* | 7/2014 | Shaw | | B65D 19/0002 |
| | | | | 108/25 |
| 2015/0114270 A1* | 4/2015 | Tsuchida | | A47B 83/02 |
| | | | | 108/44 |
| 2016/0082984 A1* | 3/2016 | Schmidt | | B61D 37/00 |
| | | | | 108/44 |
| 2019/0143869 A1* | 5/2019 | Sequi | | B60R 13/0243 |
| | | | | 296/152 |

OTHER PUBLICATIONS

"Cardboard Dividers 5 Sets 7.5"×10.5"×4" High 12 cell", eBay, Accessed on Jan. 20, 2022, Retrieved from https://www.ebay.com/itm/175101454003var=0&mkevt=1&mkcid=1&mkrid=711-53200-19255-0&campid=5337076261&toolid=10049&customid=ACF63RFK9J675c23041e8b13f9c32042ed51988cf3, in one page.

* cited by examiner

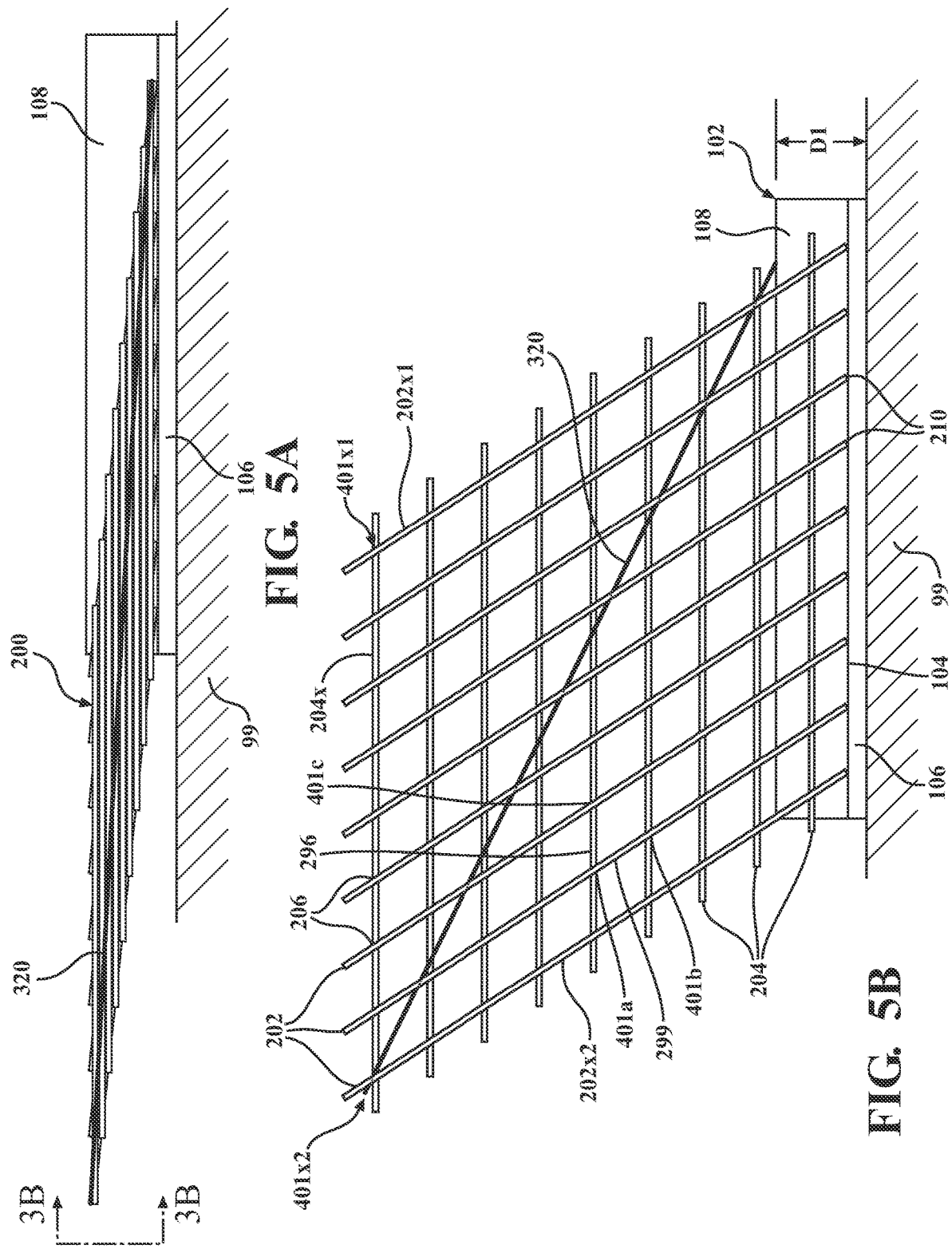

RETRACTABLE TABLE STRUCTURE

TECHNICAL FIELD

The embodiments disclosed herein relate to stowable or retractable assemblies and, more particularly, to a retractable table structure configured to be mountable and usable in a confined space (such as a vehicle passenger compartment).

BACKGROUND

A user occupying a confined space (such as a vehicle passenger compartment) may welcome various implements and accessories that enable the user to utilize the space more effectively. One such accessory may be a table structure having a table top on which the user may position items for working, eating, playing games, etc. However, there may be periods when the table top is not needed or desired. Thus, it would be beneficial to incorporate the table top into a structure is deployable and retractable as needed, so that an open or deployed table top does not occupy space in the occupant compartment when not in use.

SUMMARY

In one aspect of the embodiments described herein, a table structure includes a table top structured to be configurable to a retracted configuration and to a fully deployed configuration, and at least one shape memory material (SMM) member operably connected to the table top such that energization of the at least one SMM member configures the table top to the fully deployed configuration and de-energization of the at least one SMM member enables configuration of the table top the retracted configuration.

BRIEF DESCRIPTION OF THE DRAWINGS

A clear understanding of the key features of the embodiments disclosed herein may be had by reference to the appended drawings, which illustrate the method and system of the invention, although it will be understood that such drawings depict particular embodiments of the invention and, therefore, are not to be considered as limiting its scope with regard to other embodiments contemplated by the invention. In addition, similar elements or structures appearing in different drawing views showing different embodiments of the invention may be designated by similar reference characters.

FIG. 5A is a schematic plan view of the table structure shown in FIGS. 3A-3B, showing the housing supporting the table top when folded to the retracted configuration.

FIG. 5B is the schematic plan view of FIG. 5A, showing the table top during deployment, in an intermediate configuration between the retracted configuration and the fully deployed configuration.

DETAILED DESCRIPTION

Described herein are embodiments of a table structure configured for use in a confined space. The table structure includes a table top structured to be configurable to a retracted configuration and to a fully deployed configuration for use. At least one shape memory material (SMM) member is operably connected to the table top such that energization of the SMM member configures the table top to the fully deployed configuration and de-energization of the at least one SMM member enables configuration of the table top the retracted configuration. The table structure may be incorporated into a wall of a vehicle as an optional, retractable accessory. The table top may be deployed and retracted according to the needs of a user, thereby enabling space to be conserved when the table top is not needed.

A table structure includes a table top structured to be configurable to a retracted configuration and to a fully deployed configuration for use. At least one shape memory material (SMM) member is operably connected to the table top such that energization of the SMM member configures the table top to the fully deployed configuration and de-energization of the at least one SMM member enables configuration of the table top the retracted configuration. The table structure may be incorporated into a wall of a vehicle as an optional, retractable accessory.

Figure 1:
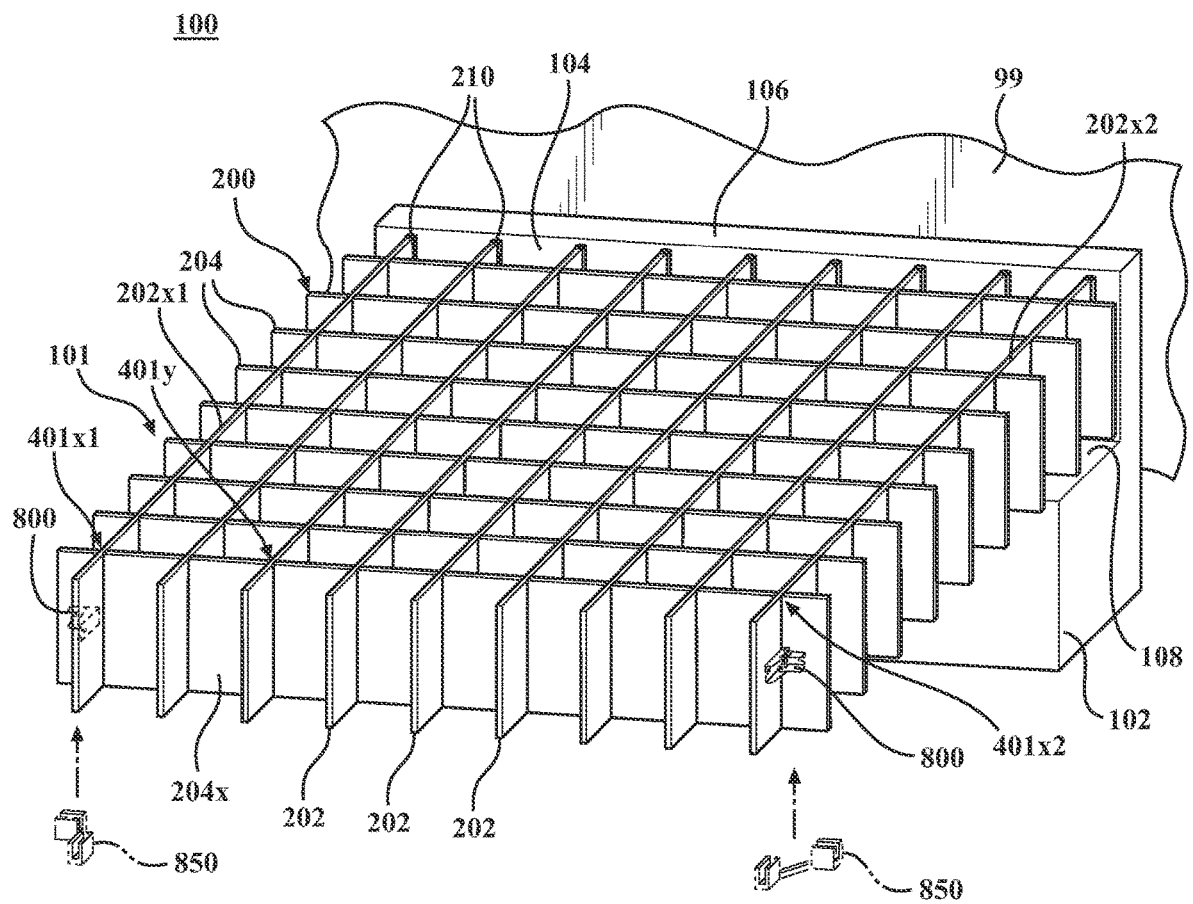
FIG. 1 is a schematic perspective view of a table structure in accordance with an embodiment described herein, shown in a fully deployed configuration.

FIG. 1 is a perspective view of a table structure in accordance with an embodiment described herein. In one or more arrangements, the table structure may include a table top 101 structured to be configurable to a retracted configuration and to a fully deployed configuration. The table structure may also include at least one shape memory material (SMM) member 320 (not shown in FIG. 1) operably connected to the table top 101 such that energization of the SMM member(s) configures the table top to the fully deployed configuration and de-energization of the SMM member(s) 320 enables reconfiguration of the table top 101 to the retracted configuration. The table top 101 of FIG. 1 is shown in the fully deployed configuration.

Figure 3A:
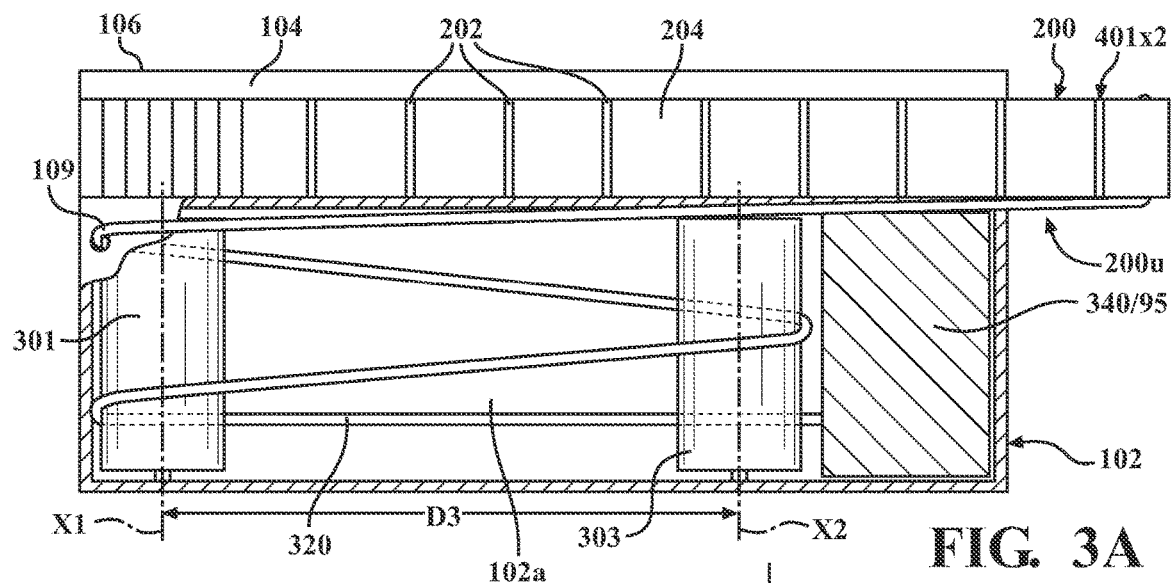
FIG. 3A is a schematic side view of an embodiment of the table structure, including a partially cutaway view of a housing on which the table top is mounted.
Figure 3B:
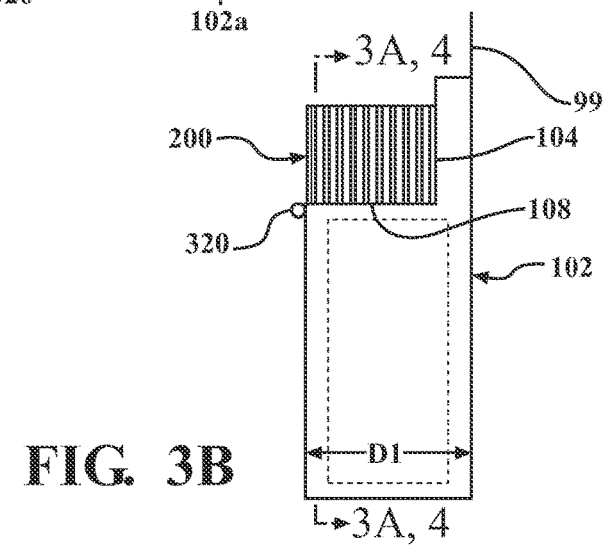
FIG. 3B is a schematic side view of the table structure shown in FIG. 3A, showing the housing supporting a table top folded to the retracted condition.
Figure 4:
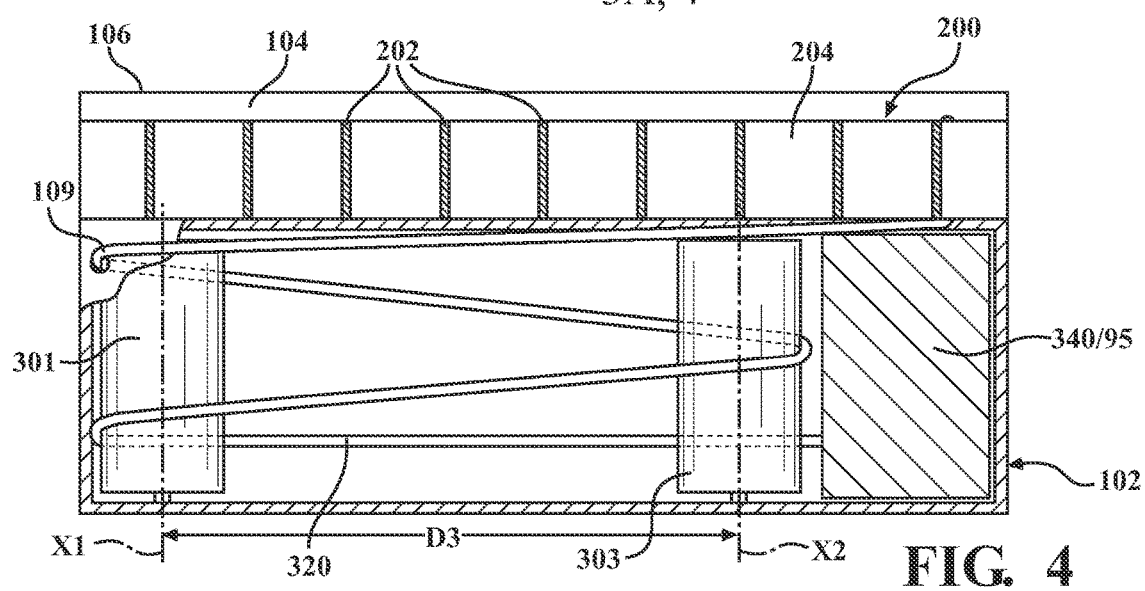
FIG. 4 is the schematic side view of FIG. 3A, showing the table top in the fully deployed condition.
Figure 5C:
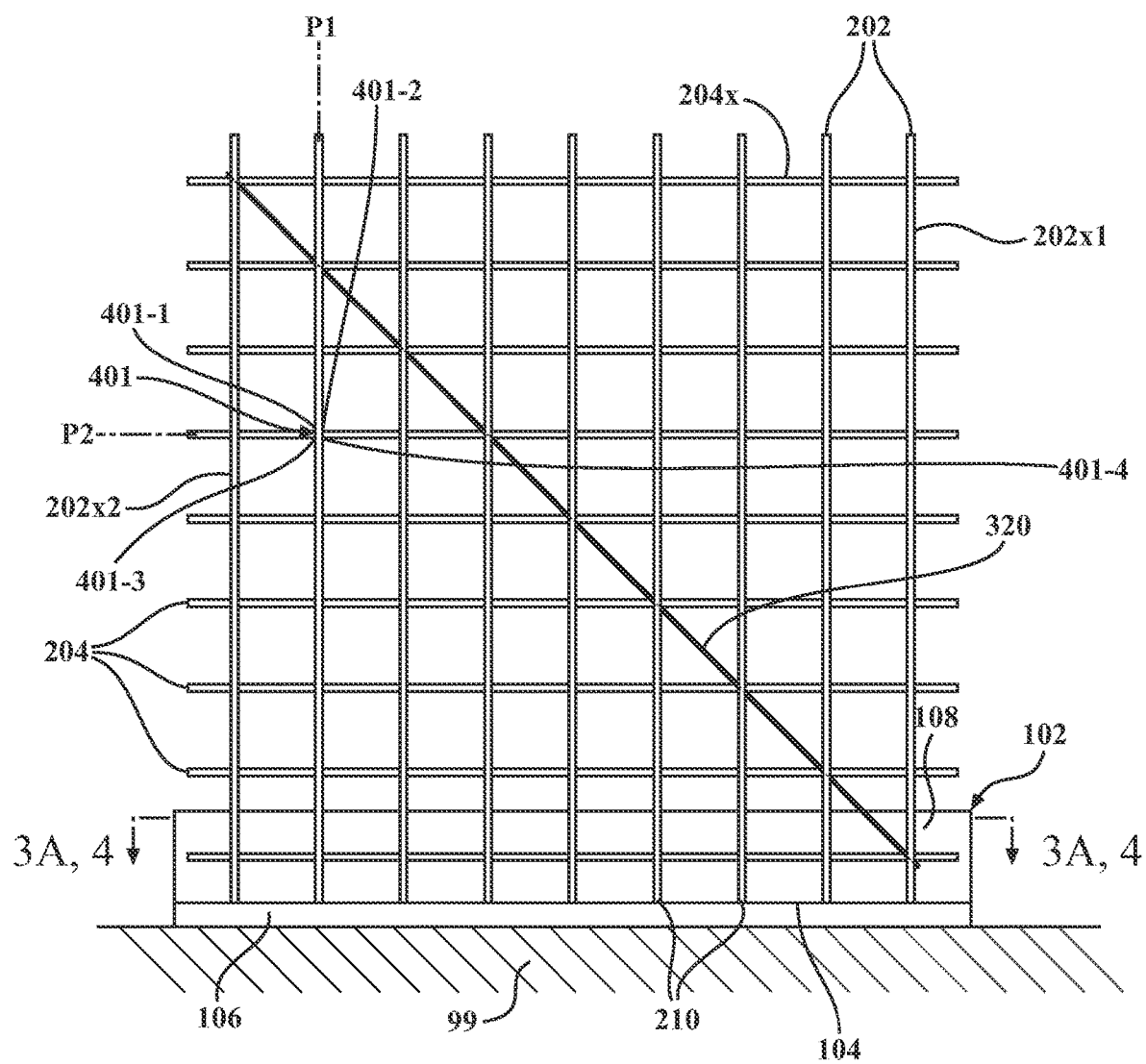
FIG. 5C is the schematic plan view of FIG. 5A, showing the table top unfolded to the fully deployed configuration.

FIG. 3A is a schematic side view of an embodiment of the table structure, including a partially cutaway view of a housing on which the table top is mounted. FIG. 3B is a schematic side view of the table structure shown in FIG. 3A, showing the housing supporting a table top folded to the retracted condition. FIG. 4 is the schematic side view of FIG. 3A, showing the table top in the fully deployed condition. FIG. 5A is a schematic plan view of the table structure shown in FIGS. 3A-3B, showing the housing supporting the table top when folded to the retracted configuration. FIG. 5B is the schematic plan view of FIG. 5A, showing the table top during deployment, in an intermediate configuration between the retracted configuration and the fully deployed configuration. FIG. 5C is the schematic plan view of FIG. 5A, showing the table top unfolded to the fully deployed configuration.

In one or more arrangements, the table top 101 may be formed from a lattice structure 200 designed to be configurable to provide the retracted configuration and the fully deployed configuration of the table top 101. Examples of the fully deployed configuration are shown in FIGS. 1, 4, and 5C. The fully deployed configuration may be an end-use configuration of the table top 101. As described herein, the lattice structure 200 may be "locked" when in the fully deployed configuration of the table top 101, to maintain the table top 101 in the fully deployed configuration while in use.

Figure 2A:
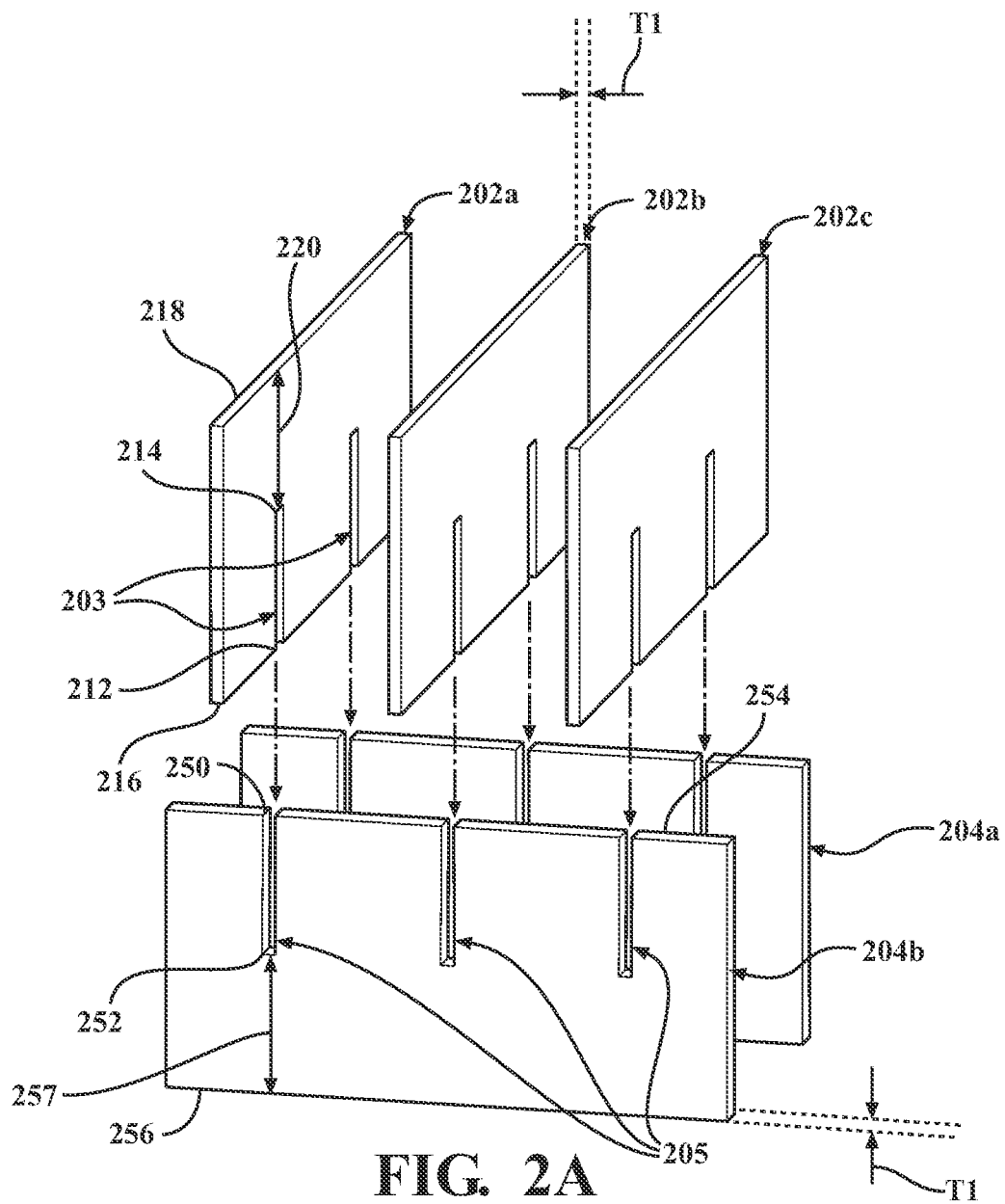
FIG. 2A is a schematic perspective exploded view of a portion of a lattice structure in accordance with an embodiment described herein.
Figure 2B:
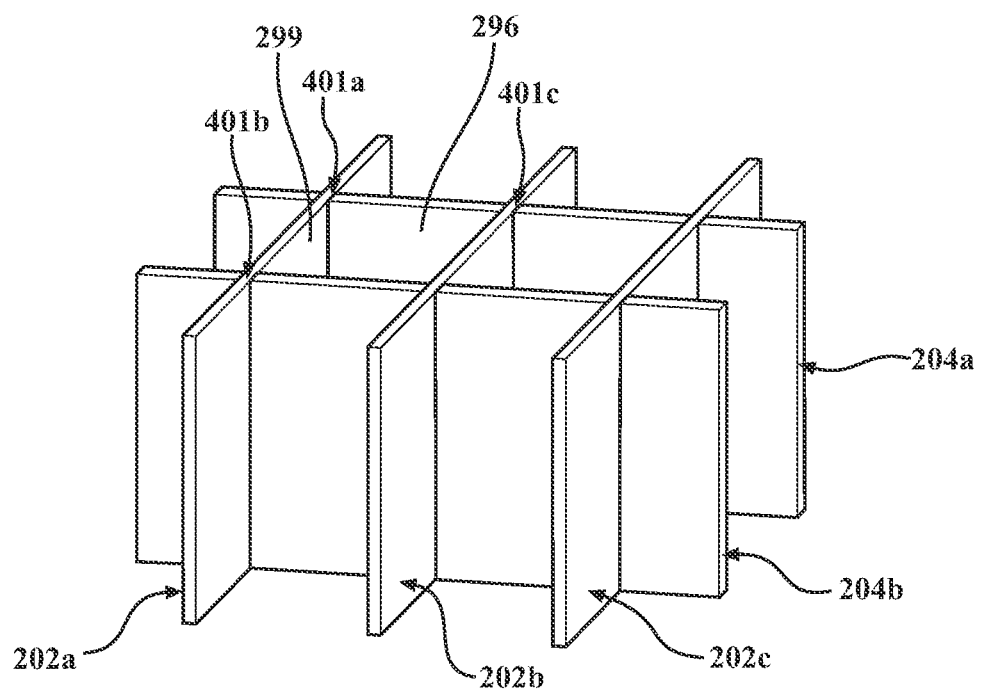
FIG. 2B is a schematic perspective view showing the elements of the lattice structure of FIG. 2A operably connected to each other.

Referring to FIGS. 1, 2B and 5C, in particular arrangements, the lattice structure 200 may be configured so that each of the table top base members 202 (described in greater detail below) extends orthogonally or substantially orthogonally with respect to each of the connecting members 204 (also described in greater detail below) when the lattice structure 200 is configured to the fully deployed configuration of the table top 101.

Referring to FIGS. 3A and 5A, the retracted configuration may be used for stowing the table top 101 when not in use. The retracted configuration may be designed to occupy a minimum volume of space measured with respect to a surface (for example, an interior or exterior wall surface of a dwelling or a vehicle) on which the table top 101 is mounted. This feature provides more internal space for other purposes when the table structure 100 is not in use.

FIGS. 2A and 2B are schematic perspective views of portions of a fully deployed lattice structure as shown in FIG. 1, showing portions of example ones of the base members 202 and connecting members 204 of FIG. 1.

Referring to FIGS. 1-2B, in one or more arrangements, the lattice structure 200 may include at least a first base member 202a rotatably connected to a mounting surface 104 (not shown in FIGS. 2A and 2B), and a second base member 202b spaced apart from the first base member 202a. The second base member 202b may be rotatably connected to the mounting surface 104 and may be structured to extend parallel to the first base member 202a.

A first connecting member 204a may be rotatably connected to both of the first and second base members 202a, 202b so that the first connecting member is rotatable with respect to both of the first and second base members, and vice versa. A second connecting member 204b may be rotatably connected to both of the first and second base members 202a, 202b so that the second connecting member 204b is rotatable with respect to both of the first and second base members, and vice versa. In addition, the second connecting member 204b may extend parallel to the first connecting member 204a.

The term "operably connected," as used throughout this description, can include direct or indirect connections, including connections without direct physical contact. In elements that are "rotatably connected, at least one of the elements may be capable of rotating with respect to another element. In some arrangements of rotatably connected elements, each element may be rotatable with respect to another element, and vice versa.

Although rotatable connections of the base members 202 and connecting members 204 are described herein in terms of two parallel base members and two associated parallel connecting members, it will be understood that the table top 101 may incorporate any desired number of base members 202 and connecting members 204 operably connected to each other as described herein, depending on a particular configuration of the table top 101. Thus, as shown in the drawings, the lattice structure 200 may include more than two base members 202 and more than two connecting members 204 operably connected to each other. Adding additional base members 202 and connecting members 204 to the lattice structure 200 may operate to increase the strength and/or size of the table top 101 according to particular operational requirements.

In one or more arrangements, the base members 202 and connecting members 204 may be flat and relatively rigid (i.e., structured to resist bending or other deformation responsive to forces expected to be encountered during operation of the table structure 100).

FIG. 2A is a perspective exploded view of a portion of a lattice structure 200 in accordance with an embodiment described herein. FIG. 2B shows a portion of the base members 202 and connecting members 204 of the lattice structure 200 after they have been operably connected to each other.

Referring now to FIGS. 2A-2B, in conjunction with FIG. 1, each of base members 202 may have at least two spaced-apart slots 203 formed therealong. Each slot 203 may include an open end 212 positioned along a first edge 216 of the base member 202, and a closed end 214 positioned opposite the open end 212. A solid portion 220 residing adjacent the slot 203 portion may extend from the slot closed end 214 to a second edge 218 of the base member 202 positioned opposite the first edge 216. Each slot 203 may be structured to receive therein a respective slot 205 and solid portion 257 of an associated connecting member 204.

Each of connecting members 204 may also have at least two spaced-apart slots 205 formed therealong. Each slot 205 may include an open end 250 positioned along a first edge 254 of the connecting member 204, and a closed end 252 positioned opposite the open end 250. A solid portion 257 residing adjacent the slot 205 may extend from the slot closed end 252 to a second edge 256 of the connecting member 204 positioned opposite the first edge 254. Each slot 205 may be structured to receive therein a respective slot 203 and solid portion 220 of an associated base member 202.

Referring to FIGS. 2A and 2B, to operably connect the base members 202 with the connecting members 204, a slot 203 and solid portion 220 of the first base member 202a may be inserted into a respective slot 205 of the first connecting member 204a until the closed end 214 of the slot in the first base member 202a contacts (or resides adjacent) the closed end 252 of the slot of the first connecting member 204a, and the slot 203 of the first base member 202a extends along the solid portion 257 residing adjacent the first connecting member slot 205. Similarly, another slot 203 and solid portion 220 of the first base member 202a may be inserted into a respective slot 205 of the second connecting member 204b until the closed end 214 of the other slot 203 in the first base member 202a contacts (or resides adjacent) the closed end 252 of the respective slot 205 of the second connecting member 204b, and the other slot 203 of the first base member 202a extends along the solid portion residing adjacent the second connecting member slot. The above-described procedure may be repeated to connect the second base member 202b to the first and second connecting members 204a, 204b.

In the manner described above, the base members 202 and connecting members 204 may be structured such that, when they are operably connected to form the lattice structure 200, the closed end 214 of each slot 203 of a base member 202 is in physical contact with (or resides adjacent to) the closed end 252 of a respective slot 205 of an connecting member 204 to which the base member 202 is to be connected. In addition, each slot 203 of each base member 202 may extend along a solid portion 257 residing adjacent an associated slot 205 formed in the connecting member 204.

In addition, the various slots of the base members 202 and connecting members 204 may be dimensioned (with respect to the respective thicknesses T1, T2 of the base members 202 and connecting members 204 and any other pertinent parameters) so as to enable simultaneous relative rotation of the first and second base members 202a, 202b with respect to the first and second connecting members 204a, 204b (and vice versa) when the base and connecting members are operably connected as described above and as shown in the drawings.

In certain arrangements, the thicknesses T1 of the base members, the thicknesses T2 of the connecting members, and the slot dimensions of the base members 202 and connecting members 204 may be specified so that, for each base member 202 and connecting member 204 that meet at an intersection, a portion of the base member 202 residing between the intersection and another, adjacent intersection may contact a portion of a connecting member 204 residing between the intersection and yet another adjacent intersection when the lattice structure 200 is folded to the retracted configuration of the table top 101. Thus, in the example arrangement shown in FIGS. 2B and 5B for example, for the base member 202a and connecting member 204a (meeting at intersection 401a), the portion 299 of the base member 202a residing between the intersections 401a and 401b may contact the portion 296 of the connecting member 204a residing between the intersections 401a and 401c when the table top 101 is folded to the retracted configuration. This effect may be achieved for each intersecting base member 202 and connecting member 204 of the lattice structure 200, thereby enabling the compact retracted structure shown in FIGS. 3B and 5A to be achieved.

Parameters such as the lengths and thicknesses of the base and connecting members 202, 204 and the number of slots formed in the base and connecting members may vary depending on the desired configuration of the table top 101. The base members and connecting members 202, 204 may be formed from any suitable material or materials, for example, metallic materials or polymer materials. The thicknesses of the base and connecting members may specified so as to (when operably connected to each other in the lattice structure) have sufficient rigidity to support the loads expected to be applied to the table structure, while also enabling contact between the base and connecting members as described herein. In one or more arrangements, the base and connecting members may have the same thicknesses (within a given range of manufacturing tolerances).

In one or more arrangements, the base members 202 may have the same thicknesses and the connecting members 204 may have the same thicknesses. In one or more particular arrangements, the base members 202 and the connecting members 204 may have the same thicknesses.

Referring to FIG. 5C, an intersection 401 of the lattice structure 200 may be a location where a plane P1 defined by a base member 202 and a plane P2 defined by a connecting member 204 meet. This may be at a location where a base member 202 and a connecting member 204 are operably connected as previously described with respect to FIGS. 2A and 2B. Each intersection 401 may form four associated corners. For instance, the example intersection 401 shown in FIG. 5C forms the corners 401-1, 401-2, 401-3, and 401-4.

A corner of the lattice structure may be defined by an intersection 401 between a base member 202 and a connecting member 204. Attachment or operative connection of a portion of an SMM member to any corner defined by an intersection 401 may be considered to be operative attachment of the SMM member to that intersection (i.e., the "intersection" may include all of the corners defined by the intersection for SMM member connection purposes).

An exterior connecting member may be the outermost connecting member of the lattice structure 200 (i.e., the connecting member positioned farthest from a mounting surface of the lattice structure 200 when the table top 101 is in the fully deployed condition). Another connecting member 204 may reside along only one side of an exterior connecting member. For example, the arrangements shown in the drawings include a single exterior connecting member 204x.

An exterior base member may be an outermost base member of the lattice structure. This may be a base member extending along either side edge of the lattice structure when the table top 101 is in the fully deployed condition. Another base member resides along only one side of an exterior base member. For example, the arrangements shown in the drawings include two exterior base members, 202x1 and 202x2.

An exterior intersection may be formed by an intersection of a base member and an exterior connecting member (e.g., intersection 401y of FIG. 1). A remote exterior intersection may be formed by an intersection of an exterior base member and an exterior connecting member (e.g., intersections 401x1 and 401x2 shown in FIGS. 1, 3A, and 5B).

In one or more arrangements, the base members 202 may be rotatably mounted to a mounting surface (such as a portion of a housing or a wall of a vehicle or a habitat) along the edges thereof, so that the table top 101 may be stowed in a relatively compact form when not in use. for example, edges of the base members may be operably connected to the mounting surface by hinged connections 210 enabling the base members to be rotated with respect to the mounting surface between a fully deployed configuration as shown in FIGS. 1 and 5C and a retracted configuration as shown in FIG. 5A.

Figure 9:
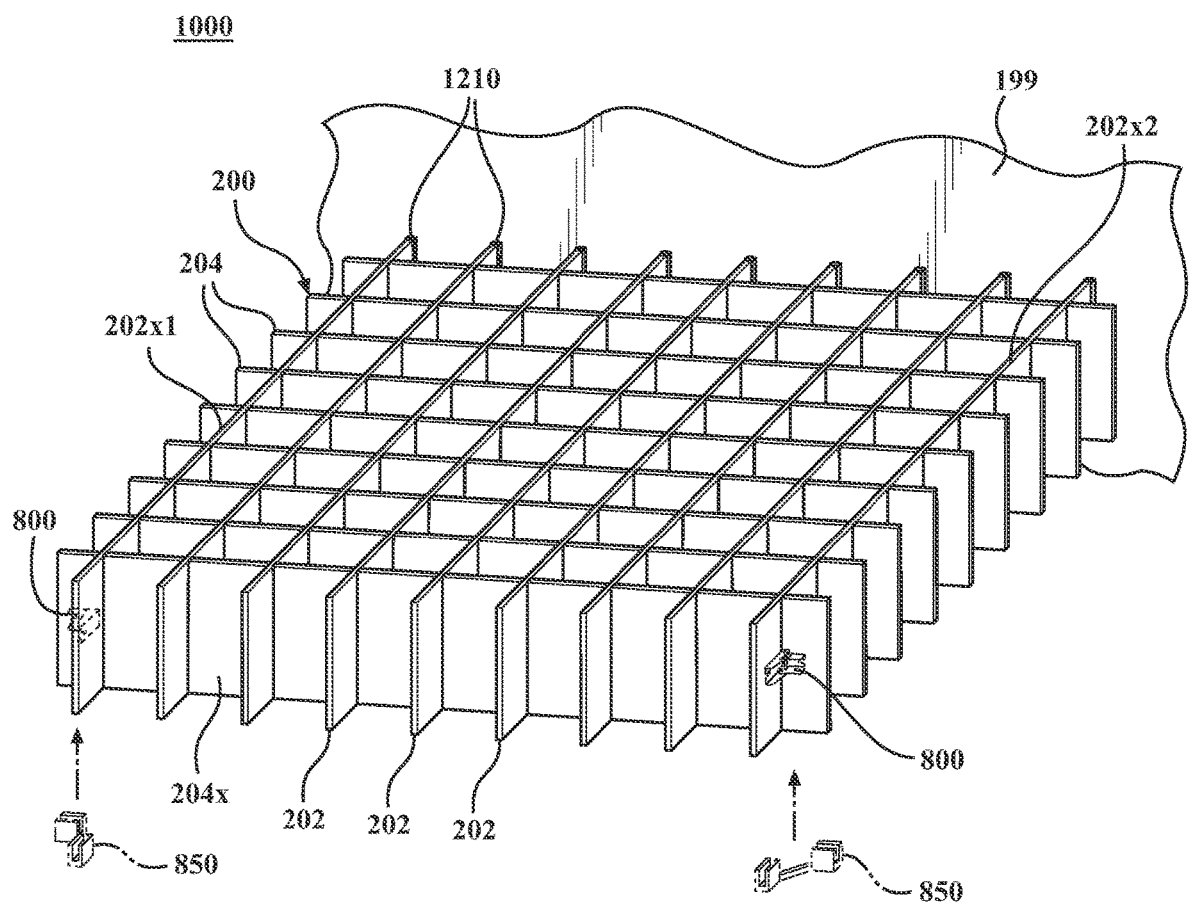
FIG. 9 is a schematic perspective view of another embodiment of the table structure.
Figure 10:
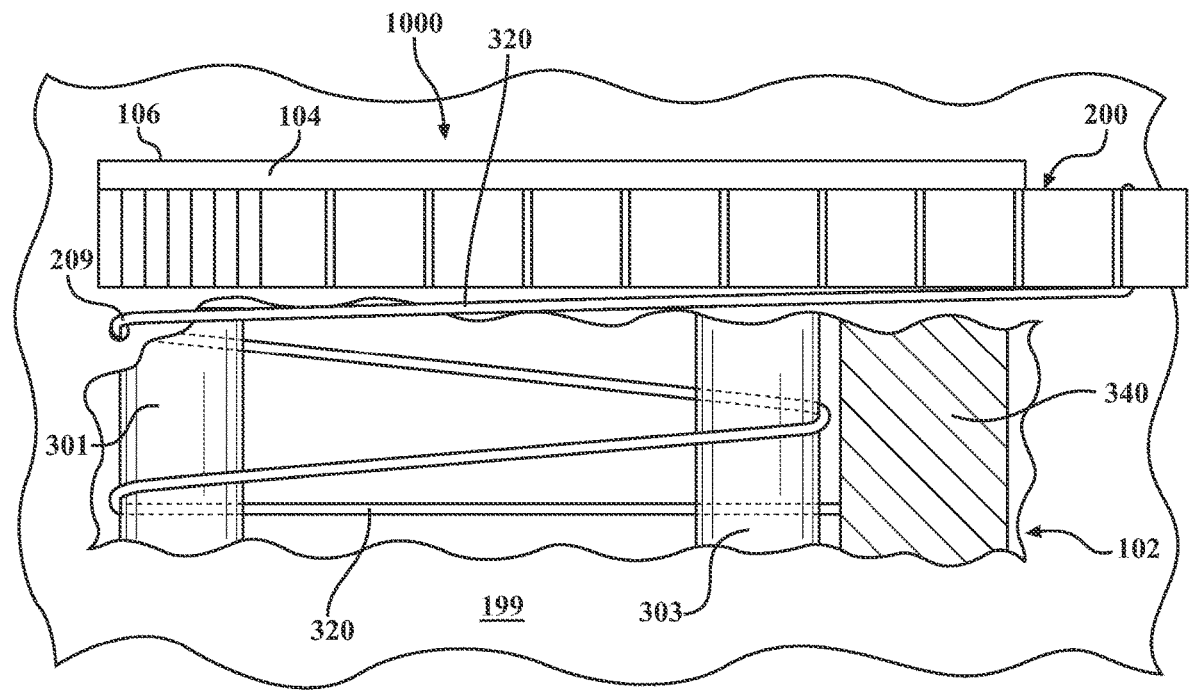
FIG. 10 is a schematic side view of the table structure embodiment shown in FIG. 9, including a partially cutaway view of a wall to which the table top is mounted.

FIGS. 1, 3A-3B, 4, and 5A-5C show the base members 202 rotatably connected to a mounting surface 104 of a housing 102. The housing 102 may define a cavity or enclosure 102a structured to contain and/or support various elements of the table structure 100 for mounting to another surface, such as a wall of a vehicle occupant compartment or a dwelling. The vehicle (not shown) may be a motor vehicle or a vehicle (such as a user-habitable camper trailer or mobile home, for example) structured to be propelled or towed by a motor vehicle. FIGS. 9 and 10 show an alternative embodiment 1000 of the table structure in which the lattice structure 200 is directly, physically rotatably connected to a wall 199.

In embodiments described herein, the table structure 100 may also incorporate at least one shape memory material (SMM) member 320 operably connected to the lattice structure 200 such that energization of the at least one SMM member 320 configures the lattice structure 200 to the fully deployed configuration and de-energization of the at least one SMM member 320 enables the lattice structure 200 to be configured to the retracted configuration.

In one or more arrangements, the SMM 320 member may be in the form of one or more SMA wire(s) attached to and/or extending between portions of the table structure 100. Pertinent parameters such as SMM member properties (such as contraction or shrinkage per unit length of a wire), the locations on the lattice structure 200 where wire contraction forces are to be exerted, a total length of wire required to achieve a desired configuration change of the lattice structure, and other parameters may be determined analytically and/or iteratively by experimentation so as to provide the fully deployed configuration of the table structure upon energization of the SMM member 320.

For example, in cases where one or more SMA wires are used, the locations on the lattice structure 200 where wire contraction forces are to be exerted and values of the other pertinent parameters may be specified so that the fully deployed configuration of the table top 101 is provided upon wire energization, and so that the wire may be stretched (manually, if necessary) after de-energization so as to enable the table top 101 to be configured from the fully deployed configuration to the retracted configuration.

An SMM (shape memory material) member 320, as used herein, may be a member which includes a SMM, such as a wire which is composed of a SMM material. SMMs are compositions which undergo a reversible transformation in response to a change in temperature or other input. SMMs can generally include shape-memory alloys (SMA) and shape-memory polymers (SMP). SMAs undergo a thermoelastic phase transformation in passing from a one phase (e.g., a martensitic phase) to another phase (e.g., an austenitic phase) when heated to a temperature above the phase change transition temperature. Below the phase change transition temperature, the alloy can be readily plastically deformed by as much as a few percent. The SMA remains deformed until heated to or above the phase change transition temperature, at which point the SMA reverts to its original or memory shape. Some SMAs have a resistivity which can be employed for direct heating (e.g., resistive heating by an electric current). As used herein, the phrase "heated to or above the phase change transition temperature" refers to both heating the alloy to a temperature within the phase change transition temperature range or above this range.

In some instances, an SMA wire incorporated into the table structure 100 can include a heating element (not shown). In some arrangements, the heating element surrounds the SMA wire along a length of the wire. However, the heating element can alternatively have any form of operative connection to the SMA wire, such that heat can be delivered. The SMA wire can be configured to increase or decrease in length (and/or other dimension) upon changing phase, for example, by being heated to a phase transition temperature.

In some arrangements, SMAs can be compositions which transition from a soft martensitic metallurgical state to a hard austenitic metallurgical state in response to heating above an austenitic transition temperature, $A_f$. The SMA can be processed while in a high-temperature austenitic phase to a desired configuration. The SMA can be cooled below a second transition temperature Mf without change of physical dimensions to create a "memory" of the desired configuration (i.e., a memorized configuration), where Mf is between the austenitic and martensitic states. Once the desired configuration is memorized, the SMA can be mechanically deformed into a first configuration while in the martensitic state. The SMA can remain in this first configuration or allow for other deformation until further heating to a temperature above $A_f$. Once heated above the $A_f$, the SMA can revert to the memorized configuration (which can also be referred to as the second configuration). During the transition from the first configuration to the second configuration, the SMA can exert large forces on elements of the actuation mechanism to which it is connected. Thus, after processing the SMA to achieve the memorized configuration, an SMM in the form of an SMA wire employed as shown in the drawings may be stretched by manually configuring the table top 101 into the retracted configuration shown in FIGS. 3A and 5A. Once heated above the $A_f$, an SMA wire of the SMM member 320 may automatically contract so as to configure the table structure into the fully deployed configuration shown in FIGS. 1 and 5C.

In some implementations, the SMM member 320 can comprise an SMA material with a high $A_f$ temperature, such as a $A_f$ temperature between about 90° C. and about 110° C. In further implementations, the SMM member 320 does not utilize a heating element, such as when employing a SMA which can be resistively heated using an electrical current. One example of a suitable SMM member 320 can include Nickel-Titanium (Ni—Ti), which has resistivity allowing it to be heated directly with an electrical current.

Conversely, when increasing in temperature, the SMA wire can transition from a predominantly martensitic state to a predominantly austenitic state. The transition in states can result in the SMA changing from the first configuration to the second configuration, or vice versa. In some implementations, SMAs which can be used with one or more implementations described herein can include Ni—Ti, Ni—Ti-Niobium (Nb) alloys, Ni—Ti-Iron (Fe) alloys, Ni—Ti-copper (Cu) alloys, Ti-Palladium (Pd) alloys, Ti—Pd—Ni alloys, Ni—Ti—Cu alloys, Ti—Nb-Aluminum (Al) alloys, Hf—Ti—Ni alloys, Ti—Nb, Ni—Zr—Ti alloys, beta-phase titanium and combinations thereof. In some implementations, the first configuration can be maintained by the SMA wire e.g., a static first configuration). In implementations having a static first configuration, the SMA wire can be referred to as having a two way shape-memory effect. Two way shape-memory effect (TMSME) refers to a SMA which has a specific memorized shape in both the martensitic state and in the austenitic state. In further implementations, the first configuration can be considered dynamic, as the first configuration is not programmed to the SMA wire. In further implementations, the SMM member can be a SMP.

The SMM member 320 can be heated in any suitable manner, now known or later developed. For instance, an SMA wire of the SMM member 320 can be heated by the Joule effect by passing electrical current through the wire. In some implementations, the SMM member 320 can include a heating element as previously described. The heating element can include one or more components configured to increase the temperature of the SMA wire, such as a resistive heating element. The heating element can be in operative connection with the SMA wire. For example, a heating element can be positioned around or enclose the entirety of the SMA wire, or the heating element can be positioned or configured to affect any portion of the SMA wire. In particular implementations, the heating element can be aligned parallel with the SMA wire. The heating element can further be in operative connection with a computing device or a control device (not shown), such as switch configured for activating the heating element. The heating element can receive an input, such as an electrical input from the computing device or control device. In response to the input, the heating element can provide heat for the SMA wire resulting in a transition from the retracted configuration of the table structure to the fully deployed configuration of the table structure as described above. In some instances, arrangements can provide for cooling of the SMA wire(s) after de-energization, to facilitate stretching of the wire(s) and return of the table structure to the retracted configuration.

"Energization" of the SMM member 320 or "energizing" the SMM member may include providing power necessary to heat an SMA wire of the SMM member 320 by the Joule effect and/or power to any heating element operably connected to the SMA wire for heating the wire so that the wire is heated above the phase change transition temperature. Similarly, "de-energization" of the SMM member or "de-energizing" the SMM member 320 may include halting power to the SMM member or to a heating element associated with the SMM member, to enable the wire to cool and be stretched so that the table top can be reconfigured into the retracted configuration.

In one or more arrangements, the SMM member 320 may include a covering (not shown) configured to electrically and/or thermally isolate the member 320 and prevent contact with adjacent wall members of the table structure. In one or more arrangements, the covering may be a silicone or rubber-based material. The covering material may be structured to be stretchable to accommodate (and be responsive to) changes in SMA wire dimensions of the SMM when an energization input is applied to the SMM member 320. The stretchability of the covering may minimize reaction forces on the SMA wire and restriction of the wire dimensions responsive to application of the input. In one or more arrangements, the covering material may be thermally and/or electrically-insulative. In one or more arrangements, the covering material may be formulated to accommodate operation of embodiments of the SMM member 320 and actuation mechanism as described herein for thousands of actuation cycles, without fracturing or otherwise failing.

The table structure 100 may include an embodiment of an SMM member support structure designed to support the SMM member 320 and facilitate operation of the SMM member during operation of the table structure 100. To maximize the effect of overall SMM member shrinkage on the lattice structure 200 within a compact space, a proportion of the length of the SMM member 320 may be supported within the housing 102 while the remainder of the SMM member 320 extends from the housing 102 to an attachment location on the lattice structure 200.

It has been found that, the greater the proportion of the SMM member length that is supported within a fixed volume inside the housing cavity 102a, the greater will be the shrinkage of the portion of the SMM member extending from the housing 102 to the connection location on the lattice structure 200. This is because an SMM member 320 having a relatively greater length will exhibit a greater amount of shrinkage when energized. The SMM member 320 may be arranged so that most of this shrinkage occurs inside the housing 102, while an additional amount of shrinkage occurs along the portion of the SMM member 320 extending between the housing 102 and the lattice structure connection location. Thus, the effective "stroke" or amount of travel of the lattice structure connection location may be controlled to a degree by controlling the length of SMM member supported inside the housing 102.

Because sharp bends in the SMM member 320 may damage the member, if it is required to bend the SMM member, it is generally desirable to control a curvature radius of a surface supporting the SMM member to have at least a certain predetermined value. In particular arrangements, the minimum radius of the curved supporting surface may be in the range 5 millimeters±2 millimeters.

In some arrangements, the SMM member support structure may include at least one support member having a curved outer surface structured to contact and support a portion of the SMM member 320 during operation of the table structure 100. In one or more arrangements, the SMM member support member may be a roller 301 rotatably mounted inside the housing cavity 102a along a rotational axis X1 and including a cylindrical outer surface having the predetermined minimum SMM member bend radius.

In some arrangements, the SMM member 320 may be wound one or more times around the roller 301 to adjust, as needed, the length of SMM member 320 supported inside the housing cavity 102a. The roller 301 may be supported on suitable bearings to minimize rotational friction. The roller outer surface may be formed or coated with a material selected to have low coefficients of static and/or dynamic friction with respect to the material from which an outer surface of the SMM member 320 is formed. These features may aid in minimizing resistance to shrinkage and movement of the SMM member 320 during energization and contraction of the SMM member.

Referring to FIGS. 3A and 4, in one or more other arrangements, the SMM member support structure may include a pair of spaced apart rollers 301, 303 structured as previously described. The rotational axes X1, X2 of the rollers 301, 303 may be spaced apart a distance D3. The SMM member 320 may be wound around both of the rollers 301, 303 as shown in FIGS. 3A and 4 to enable an extra length of the SMM member 320 to be supported inside the housing cavity 102a. This arrangement may aid in maximizing the total length of the straight portions of the SMM member 320 (and correspondingly minimizing the total lengths of the bent portions of the member), to reduce the probability of damage by bending. In particular arrangements, the table structure 100 may be structured so as to enable the spacing D3 of the rollers 301, 303 to be adjusted as need to further facilitate control of the length of SMM member 320 supported inside the housing cavity 102a.

Using the structures described above, the "stroke" of the portion of the SMM member 320 extending between the housing 102 and the connection location of the SMM member with the lattice structure 200 may be optimized according to deployment requirements of a particular lattice structure. Positioning at least part of the SMM member 320 in a housing may also aid in preventing damage to the SMM member.

Referring to FIGS. 1, 3A-3B, and 4, in one or more arrangements, the housing 102 may have a mounting surface 104 and an upper surface 106. The base members 202 may be rotatably connected to the mounting surface 104 as previously described. The housing 102 may also have a table top support surface 108 structured and positioned to support a portion of the table top 101 when the table top is in the fully deployed condition.

Referring to FIG. 3A, a side of the housing 102 facing in a direction toward the exterior connecting member 204x when the table top 101 is fully deployed may include an opening 109 structured to enable a portion of the SMM member 320 to extend out of the housing cavity 102a and from the opening 109 to the location of connection of the SMM member 320 to the lattice structure 200.

FIG. 3B is a schematic side view showing the housing 102 supporting a table top 101 folded to the retracted condition. A depth D1 of the housing 102 extending outwardly from the wall 99 may be determined by such factors as a required radius of the roller(s) 301, 303, the size(s) of any other table structure elements contained within the housing 102, the folded depth of the table top 101, and other pertinent factors.

Referring to FIGS. 9 and 10, in other arrangements, the lattice structure 200 may be mounted directly to a mounting structure such as surface of a wall 199 by directly rotatably connecting the base members 202 to the wall at hinged connections 1210. Other elements of the table structure 100 may then be positioned inside the wall 199 supporting the lattice structure 200 or in another location more remote from the lattice structure. An opening 209 may be formed in the wall 199 to enable the SMM member 320 to transit from inside the wall 199 to a connection location on the lattice structure 200, as previously described. The opening 209 may be lined with a low-friction material as previously described to provide a low-friction contact interface between the SMM member 320 and the portion of the wall 199 defining the opening 209.

Referring again to FIGS. 1-8, and I particular to FIG. 3A, in arrangements described herein, the SMM member 320 may extend from the opening 109 and along an underside 200u of the lattice structure 200 to a connection location on the lattice structure. In general, operably connecting the SMM member 320 to an exterior connecting member or exterior base member may provide a relatively greater mechanical advantage for purposes of reconfiguring the lattice structure 200 into the fully deployed condition of the table top 101.

In one or more arrangements, a portion of the SMM member 320 may be operably connected to an exterior connecting member (such as exterior connecting member 204x in FIG. 1) of the lattice structure 200. In one or more particular arrangements, an end of the SMM member may be directly, physically attached to the exterior connecting member 204x.

In one or more arrangements, a portion of the SMM member 320 may be operably connected to an exterior base member (such as base member 202x1 or 202x2 of FIG. 1) of the lattice structure 200. In one or more particular arrangements, an end of the SMM member 320 may be directly, physically attached to an exterior base member.

In one or more arrangements, a portion of the SMM member 320 may be operably connected to an underside of an exterior intersection (such as intersection 401y of FIG. 1) of the lattice structure 200. In one or more particular arrangements, an end of the SMM member 320 may be directly, physically attached to an intersection of the lattice structure 200.

In one or more arrangements, a portion of the SMM member 320 may be operably connected to an underside of a remote exterior intersection (such as intersection 401x1 or 401x2 of FIG. 1) of the lattice structure 200. In one or more particular arrangements, an end of the SMM member 320 may be directly, physically attached to a remote exterior intersection of the lattice structure.

In one or more particular arrangements, a portion of the SMM member 320 may be operably connected to the underside of a remote exterior intersection of the lattice structure (such as intersection 401x2 of FIG. 1) spaced farthest from the housing opening 109. In one or more particular arrangements, an end of the SMM 320 member may be directly, physically attached to the remote exterior intersection 401x2 of the lattice structure 200 spaced farthest from the opening 109. Directly attaching the SMM member 320 to the remote exterior intersection 401x2 of the lattice structure 200 spaced farthest from the opening 109 may provide the greatest mechanical advantage for purposes of reconfiguring the lattice structure 200 into the fully deployed condition of the table top 101.

Alternatively, the SMM member 320 may be directly, physically attached to another portion of the lattice structure 200.

Figure 6:
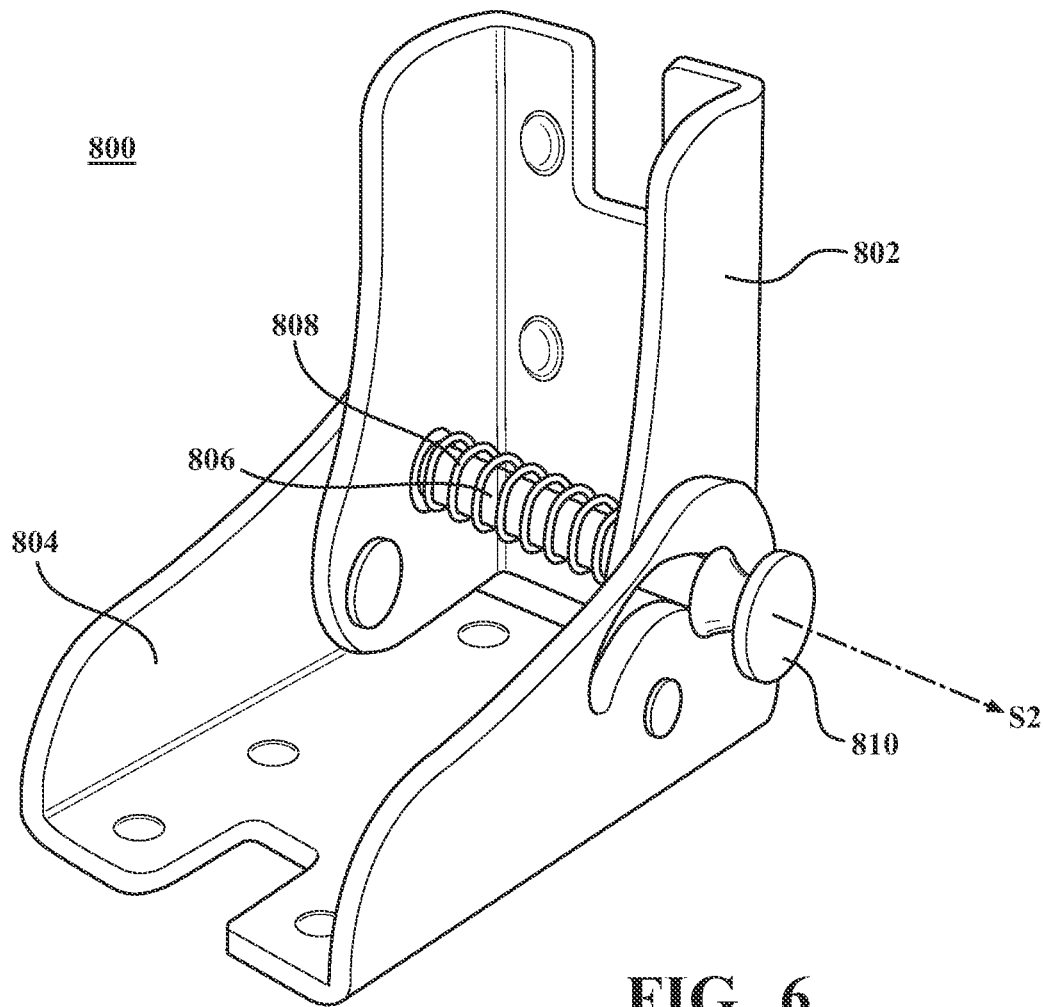
FIG. 6 is a schematic perspective view of a latch mountable on the table top to maintain the table top in the fully deployed configuration.
Figure 7:
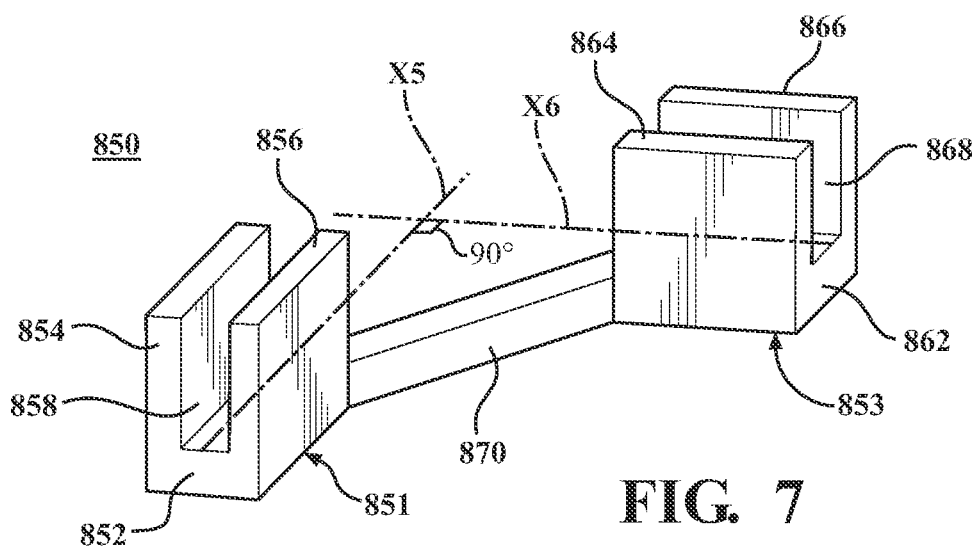
FIG. 7 is a schematic perspective view of a clip attachable to the table top to maintain the table top in the fully deployed configuration.

Referring to FIGS. 1, 6, and 7, the table structure 100 may incorporate a lock structured to releasably maintain the table top 101 in the fully deployed configuration. "Releasably maintain" means that the lock is actuatable or operable when the table top lattice structure 200 is in the fully deployed condition of the table top 101, to maintain the lattice structure 200 in the fully deployed condition of the table top 101.

Any of a variety of locks and locking mechanisms (either currently known or later developed) may be used. Referring to FIGS. 1 and 6, in one example, a known latch 800 may be attached to the lattice structure 200 at exterior corners defined by each of remote exterior intersections 401x1 and 401x2 (FIG. 1). The latch 800 may have a first portion 802 and a second portion 804 rotatably coupled to the first portion 802 by a spring-loaded hinge or shaft 806. Referring to FIGS. 1 and 6, the first portion 802 may be attached to one of the exterior connecting member 204x and an exterior base member (one of 401x1 and 401x2), and the second portion 804 may be attached to the other one of the exterior connecting member 204x and the exterior base member.

The latch first and second portions 802, 804 may be folded toward each other to "close" the latch 800 when the table top 101 is in the retracted condition shown in FIG. 5A. The first and second portions 802, 804 may also be freely rotatable to, as the table top 101 is deployed, open with respect to each other toward the fully open configuration shown in FIG. 6. During the process of opening the latch 800, the spring 808 may exert an axially outward pressure on the shaft 806. The latch 800 may be structured to reach a fully open configuration of the latch when the lattice structure 200 reaches the fully deployed configuration of the table top 101. When the latch 800 reaches its fully open configuration, the shaft 806 may move to a "locked" position under pressure from the spring 808. When the latch 800 is in the locked configuration shown in FIG. 6, the latch may help maintain the lattice structure 200 in the fully deployed configuration of the table top 101.

When the shaft 806 is in the locked position, the latch 800 is prevented from closing until the shaft 806 is manually pressed axially toward the latch first and second portions 802, 804 (using button 810) to release the shaft 806, thereby enabling rotation of the latch first and second portions 802, 804 to close the latch 800. After the latch shaft 806 is released, the table top 101 may be reconfigured toward the retracted configuration, during which the latch 800 will close as previously described.

Referring now to FIG. 7, in another embodiment of a lock for maintaining the table top 101 in the fully deployed configuration, a clip 850 may be structured to receive therein a portion of a connecting member 204 and a portion of a base member 202 intersecting the connecting member 204. In certain arrangements, and as shown in FIGS. 1 and 12, the clip 850 may be applied to the exterior connecting member 204x and an exterior base member (one of base members 202x1 and 202x2) intersecting the exterior connecting member 204x.

In one or more arrangements, the clip 850 may include a first attachment portion 851 having a base 852 and a pair of opposed arms 854 and 856 extending from the base 852. The opposed arms 854, 856 may define a table member receiving cavity 858 therebetween. The cavity 858 may extend along an axis X5. the opposed arms 854, 856 may be spaced apart a distance specified in relation to the thickness of a connecting member 204 or base member 202 to be received in the cavity 858, so that an interference fit will be generated between the lattice member and the first attachment portion 851 when the lattice member is inserted into the cavity 858.

Similarly, the clip 850 may include a second attachment portion 853 having a base 862 and a pair of opposed arms 864 and 866 extending from the base 862. The opposed arms 864, 866 may define a table member receiving cavity 868 therebetween. The cavity 868 may extend along an axis X6. As seen in FIG. 6, the axis X6 may extend orthogonally with respect to the axis X5. The opposed arms 864, 866 may be spaced apart a distance specified in relation to the thickness of a connecting member 204 or base member 202 to be received in the cavity 868, so that an interference fit will be generated between the lattice member and the second attachment portion 853 when the lattice member is inserted into the cavity 868. A connecting portion 870 may extend between the first and second attachment portions 851, 853 to maintain the spatial relationship and the orthogonal axial orientation of the attachment portions.

Figure 12:
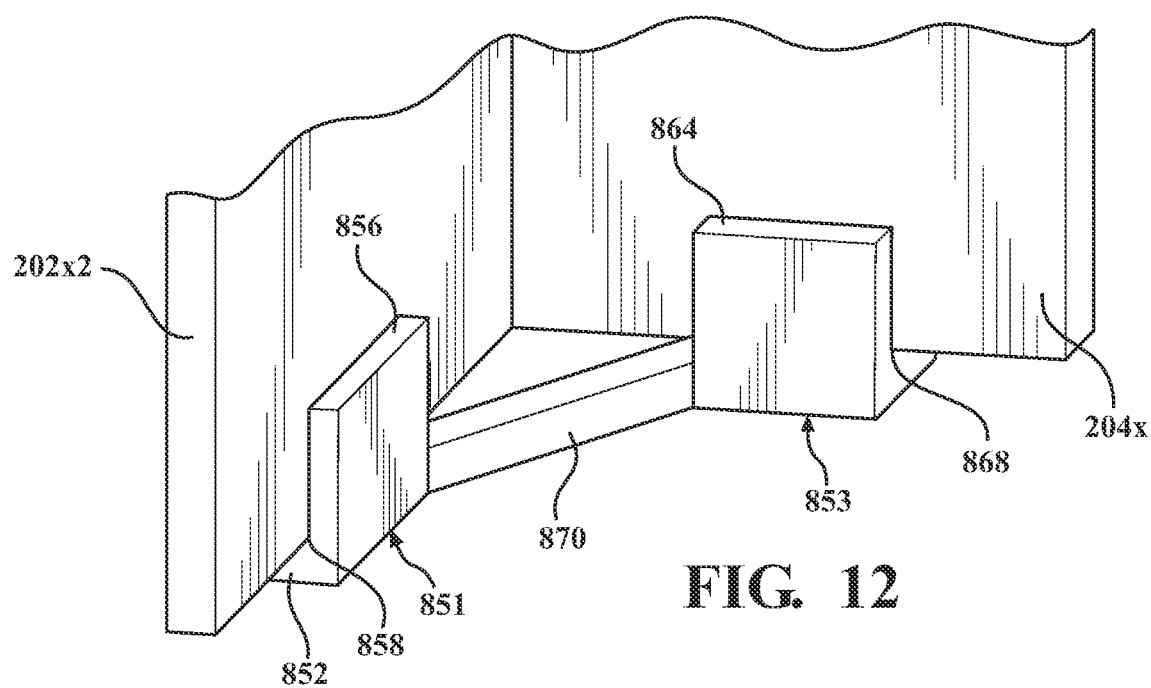
FIG. 12 is a schematic perspective view of the clip of FIG. 7 shown attached to an intersecting base member and connecting member of the lattice structure.

In particular arrangements, the clip 850 may be applied to the exterior connecting member 204x and to an adjacent base member 202 after the table top is fully deployed (as shown in FIG. 12), to maintain the table top in the fully deployed configuration. In other arrangements, the clip 850 may be applied any connecting member 204 of the lattice structure 200, and to any base member 202 intersecting the connecting member 204, to help maintain the table top 101 in the fully deployed configuration. Any desired number of such clips may be applied to the fully deployed lattice structure 200 to aid in maintaining the table top 101 in the fully deployed configuration. The clip 850 may be formed from a suitable polymer or any other suitable material. In certain arrangements, one or more clips 850 may be stored in a compartment (not shown) of the housing 102.

Referring to the drawings, the table structure 100 may also include a power source/heating element 340 operably connected to the SMM member 320. The power source/heating element 340 may include (as an energization source for the SMM member) a heat generating element (not shown) configured to heat the SMM member, or an electrical power source (not shown) configured to provide an electric current to the SMM member to resistively heat the SMM member 320, depending on the structure of the SMM member.

The energization source may provide heat or electrical power needed to heat the SMM member 320 to a temperature where the desired phase transformation occurs in the shape memory material of the SMM member 320, as previously described herein. Thus, when the shape-memory material member 320 is energized by application of heat or an electric current, the member 320 may contract to force portions of the lattice structure 200 connected to associated spaced-apart portions of the SMM member 320 to move toward each other, thereby configuring the lattice structure 200 into the fully deployed configuration.

An energization command may be communicated to the table structure 100 locally (e.g. by a button or control located near the table top) or remotely (e.g., from outside a vehicle, dwelling, or other structure in which the table structure 100 is incorporated).

Figure 11:
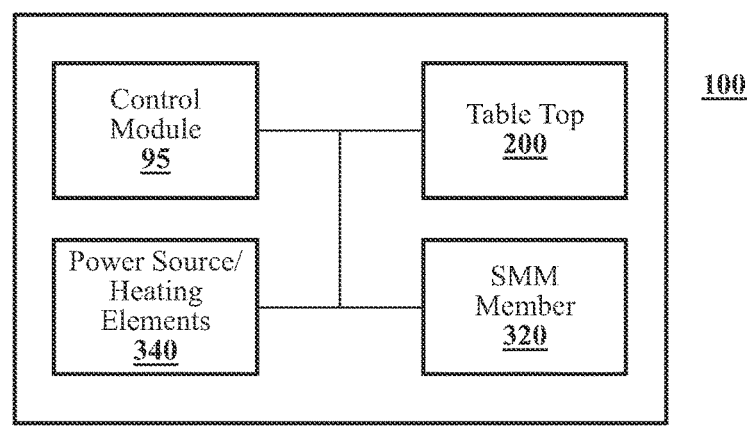
FIG. 11 is a block schematic diagram showing elements of a table structure in accordance with an embodiment described herein.

FIG. 11 is a block schematic diagram showing elements of a table structure in accordance with an embodiment described herein. Referring to FIGS. 3A, 4A, 10, and 11, the table structure 100 may include a control module 95 including all computing device(s), control circuitry and other elements (e.g., a transformer) necessary for controlling energization of an SMA wire or other SMM member as described herein, responsive to a table deployment command generated by pushing a button, operating a switch, or otherwise operating the power source/heating element 340 to energize the SMM member 320 to deploy the table top 101. The table structure 100 may be operated manually or automatically, responsive to the occurrence of one or more predetermined table top activation condition(s).

Figure 8:
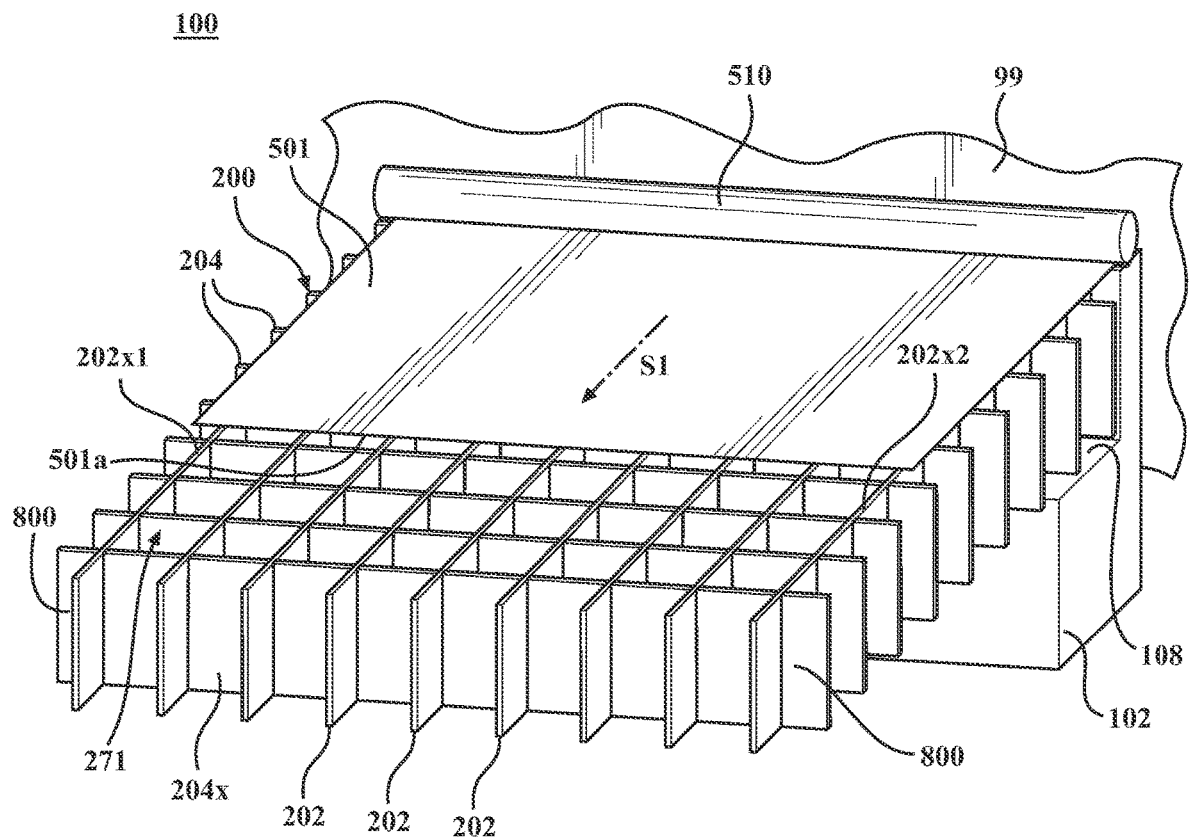
FIG. 8 is a schematic perspective view of the table structure shown in FIG. 1, with the addition of a retractable cover designed to cover the table top when the table top is in the fully deployed configuration.

Referring now to FIG. 8, the table structure 100 may include a retractable cover 501 structured to overlie or cover the table top 101 when the table top is in the fully deployed configuration. In one or more arrangements, the cover 501 may be wrapped around a spring-loaded roller (not shown) contained in a cover housing 510 mountable to the upper surface 106 of the housing 102. The cover 501 may be manually deployed from the roller in direction S1 to cover the table top 101.

In certain arrangements, the cover 501 may be formed from a flexible sheet of polymer material (such as Mylar®) or other suitable material. The cover material may have sufficient stiffness to resist depression of the material into the interstitial cavities (such as cavity 271) formed by the lattice structure 200. An end 501a of the cover 501 may be securable to the exterior connecting member 204x or otherwise to one or more exterior edge(s) of the lattice structure 200 to retain the cover 501 in position when fully deployed.

FIGS. 5A-5C are schematic plan views of the table structure embodiment shown in FIG. 1. FIGS. 5A-5C illustrate deployment of the table top from the retracted configuration (FIG. 5A). The table top 101 may be configured so as to "fold" into the retracted configuration shown in FIG. 5A as the base members 202 and connecting members 204 rotate with respect to each other as described herein.

In operation, to deploy the table top 101 to the fully open configuration, an energized SMM member 320 may increase in temperature in response to an energization input, such as from a computing device and/or a power source. For example, an SMA wire of the SMM member 320 can heat up in response to the resistance of the wire to electrical input or heating by a heating element. The SMA wire, upon reaching a transition temperature $A_f$, changes from the first wire configuration to a second wire configuration (as previously described with respect operation of the SMM member 320). In this implementation, the SMA wire in the second configuration can contract in a direction along the length of the wire, thereby applying a deployment force on the portion of the lattice structure 200 to which it is connected. Contraction of the wire causes the lattice structure 200 to reconfigure from the retracted configuration shown in FIG. 5A, through various intermediate configurations (an example of which is shown in FIG. 5B) between the retracted configuration and the fully deployed configuration, to the fully deployed configuration shown in FIG. 5C.

When it is desired to fold the table top 101 to the retracted configuration, the power source/heating element 340 may be operated to de-energize the SMM member 320. When the SMM member 320 has sufficiently cooled, the SMM member may be stretched to enable the lattice structure 200 to be folded manually back to the retracted configuration shown in FIG. 5A. If desired, a catch or other mechanism (nor shown) may be mounted on the housing 102 and may be operable to secure the table top 101 in the retracted configuration.

Operation of the table structure embodiment shown in FIGS. 9 and 10 (where the lattice structure 200 is mounted directly to a wall 199) may be the same as operation of the embodiment just described, in which the lattice structure 200 is mounted on a separate housing 102.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A table structure comprising:
    a table top structured to be configurable to a retracted configuration and to a fully deployed configuration, the table top having a lattice structure including:
        a first base member rotatably connected to a mounting structure; and
        a second base member rotatably connected to the mounting structure so as to enable the second base member to move in a direction toward the first base member during configuration of the table top to the retracted configuration, the second base member also extending parallel to the first base member; and
    at least one shape memory material (SMM) member operably connected to the table top such that energization of the at least one SMM member configures the table top to the fully deployed configuration and de-energization of the at least one SMM member enables configuration of the table top the retracted configuration.

2. The table structure of claim 1, wherein the lattice structure further comprises:
    a first connecting member rotatably connected to both of the first and second base members; and
    a second connecting member rotatably connected to both of the first and second base members and extending parallel to the first connecting member.

3. The table structure of claim 2 wherein the lattice structure is structured so that each of the first and second base members extends orthogonally with respect to each of the first and second connecting members when the lattice structure is in the fully deployed configuration.

4. The table structure of claim 2 wherein a portion of the SMM member is operably connected to an exterior connecting member of the lattice structure.

5. The table structure of claim 1 wherein a portion of the SMM member is operably connected to an exterior base member of the lattice structure.

6. The table structure of claim 1 wherein the SMM member-is operably connected to an exterior intersection of the lattice structure.

7. The table structure of claim 6 wherein the SMM member is operably connected to a remote exterior intersection of the lattice structure.

8. The table structure of claim 1 wherein the mounting structure comprises an interior surface of a vehicle occupant compartment.

9. The table structure of claim 1 wherein the mounting structure comprises a housing structured for mounting to a surface separate from the housing, the housing defining an enclosure.

10. The table structure of claim 9 wherein the housing defines a table top support surface structured to support at least a portion of the table top.

11. The table structure of claim 1 wherein the at least one SMM member comprises at least one shape memory alloy (SMA) wire.

12. The table structure of claim 1 further comprising a lock structured to releasably maintain the table top in the fully deployed configuration.

13. The table structure of claim 1 further comprising a lock structured to releasably maintain the table top in the fully deployed configuration, wherein the lock comprises at least one latch attached to the table top.

14. The table structure of claim 1 further comprising a lock structured to releasably maintain the table top in the fully deployed configuration, wherein the lock comprises a clip structured to receive therein a portion of a connecting member and a portion of a base member intersecting the connecting member.

15. The table structure of claim 1, further comprising a retractable cover structured to cover the table top when the table top is in the fully deployed configuration.

16. A vehicle including a table structure in accordance with claim 1 mounted to an interior surface of a vehicle occupant compartment.

17. A table structure comprising:
    a table top structured to be configurable to a retracted configuration and to a fully deployed configuration;
    at least one shape memory material (SMM) member operably connected to the table top such that energization of the at least one SMM member configures the table top to the fully deployed configuration and de-energization of the at least one SMM member enables configuration of the table top the retracted configuration, the table top including a lattice structure having at least:
    a first base member rotatably connected to a mounting structure;
    a second base member rotatably connected to the mounting structure and structured to extend parallel to the first base member;
    a first connecting member rotatably connected to both of the first and second base members; and
    a second connecting member rotatably connected to both of the first and second base members and extending parallel to the first connecting member,
    wherein the SMM member is operably connected to a remote exterior intersection of the lattice structure spaced farthest from an opening formed in the mounting structure through which the SMM member passes.

18. A table structure comprising:
a table top structured to be configurable to a retracted configuration and to a fully deployed configuration; and
at least one shape memory material (SMM) member operably connected to the table top such that energization of the at least one SMM member configures the table top to the fully deployed configuration and de-energization of the at least one SMM member enables configuration of the table top the retracted configuration; and
a rotatable roller structured to contact and support a portion of the SMM member during operation of the table structure.

19. The table structure of claim 18 comprising a pair of spaced-apart rotatable rollers structured and positioned to enable a portion of the SMM member to extend between, and be supported by, the pair of rollers.

* * * * *